(12) United States Patent
Eowsakul

(10) Patent No.: US 8,979,983 B2
(45) Date of Patent: Mar. 17, 2015

(54) AIR SEPARATION MODULE MANIFOLD FLOW STRUCTURE AND SYSTEM

(71) Applicant: Hamilton Sundstrand Corporation, Windsor Locks, CT (US)

(72) Inventor: Vanwijak Eowsakul, Holyoke, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 95 days.

(21) Appl. No.: 13/713,111

(22) Filed: Dec. 13, 2012

(65) Prior Publication Data

US 2014/0165836 A1    Jun. 19, 2014

(51) Int. Cl.
*B01D 53/22*    (2006.01)

(52) U.S. Cl.
CPC ...................................... *B01D 53/22* (2013.01)
USPC .................................. 96/7; 96/4; 96/8; 95/54

(58) Field of Classification Search
USPC ................... 96/4, 7, 8; 95/45, 54; 244/135 R
See application file for complete search history.

(56) References Cited

U.S. PATENT DOCUMENTS

| | | | |
|---|---|---|---|
| 4,560,394 A * | 12/1985 | McDonald et al. | 95/54 |
| 6,141,950 A | 11/2000 | Smith et al. | |
| 6,289,884 B1 | 9/2001 | Blandino et al. | |
| 6,347,662 B1 | 2/2002 | Davidian et al. | |
| 6,451,090 B2 * | 9/2002 | Monereau et al. | 95/55 |
| 6,543,428 B1 | 4/2003 | Blandino et al. | |
| 6,997,013 B2 | 2/2006 | Jones | |
| 7,013,905 B2 | 3/2006 | Jones et al. | |
| 7,048,231 B2 | 5/2006 | Jones | |
| 7,169,213 B2 * | 1/2007 | Liu et al. | 96/4 |
| 7,172,157 B2 | 2/2007 | Jones | |
| 7,175,692 B2 | 2/2007 | Schwalm | |
| 7,179,323 B2 * | 2/2007 | Stein et al. | 95/54 |
| 7,219,510 B2 | 5/2007 | Jones | |
| 7,445,659 B2 | 11/2008 | Schwalm | |
| 7,625,434 B2 | 12/2009 | Tom et al. | |
| 7,779,899 B2 | 8/2010 | Jibb et al. | |
| 7,828,874 B2 | 11/2010 | Surawski et al. | |
| 8,110,027 B2 | 2/2012 | Beeson | |
| 8,388,743 B2 * | 3/2013 | Suzuki et al. | 96/6 |
| 2003/0015185 A1 | 1/2003 | Dutart | |
| 2005/0229968 A1 * | 10/2005 | Jones et al. | 137/209 |
| 2006/0144777 A1 * | 7/2006 | Kumano et al. | 96/8 |
| 2006/0174762 A1 * | 8/2006 | Kaschemekat et al. | 95/45 |
| 2008/0011157 A1 * | 1/2008 | Wynn et al. | 95/45 |
| 2014/0013951 A1 * | 1/2014 | Schaeffer et al. | 96/7 |

* cited by examiner

*Primary Examiner* — Jason M Greene
(74) *Attorney, Agent, or Firm* — Carlson, Gaskey & Olds, PC

(57) ABSTRACT

An air separation module has an inlet for receiving a source of air. The inlet communicates with an inlet manifold and the inlet manifold communicates with a plurality of canisters. The canisters are provided with hollow fibers constructed such that oxygen can permeate the fiber and nitrogen passes through the fiber. A jacket manifold surrounds the canisters and the jacket manifold receives oxygen that has permeated the fibers. The canisters extend to a downstream end, and to an outlet. The jacket manifold communicates with a jacket outlet manifold and an outlet for separated oxygen. The outlet for the jacket manifold is at a downstream end of the canisters.

1 Claim, 1 Drawing Sheet

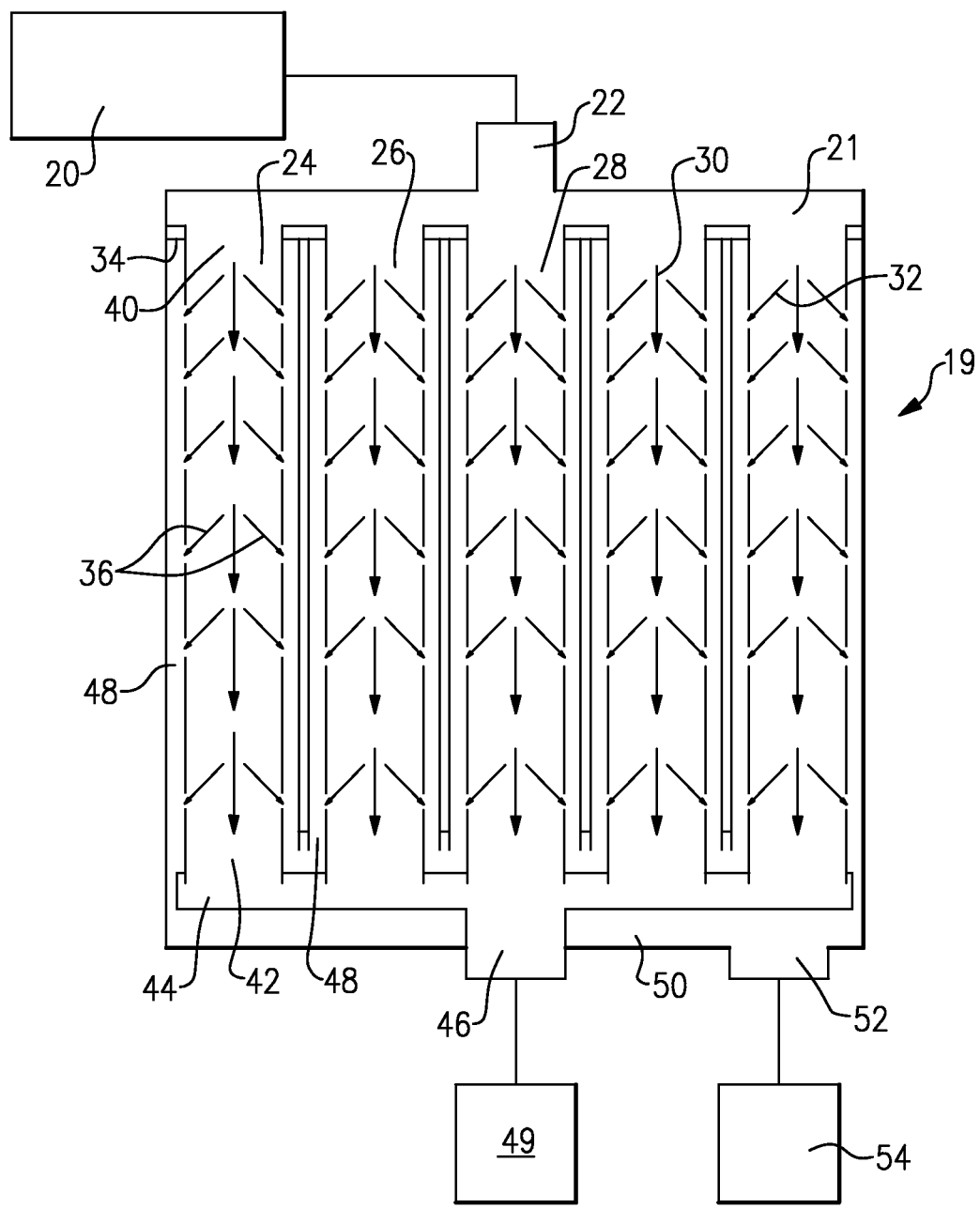

AIR SEPARATION MODULE MANIFOLD FLOW STRUCTURE AND SYSTEM

BACKGROUND OF THE INVENTION

This application relates to an air separation module having a manifold wherein the flow direction is selected to increase the efficiency of separation.

Air separation modules are known and typically include a plurality of canisters including fibers. The canisters extend from an inlet end that receives hot air, such as from a compressor in a gas turbine engine. Tube sheets are spaced from each other within the canisters. Hollow fibers are constructed to connect the tube sheets. The hollow fibers are constructed such that oxygen can permeate the fibers and move into the chamber surrounding the fibers. Nitrogen passes through the fiber to a downstream chamber. The hot air passes through the canisters, and the fibers serve to separate nitrogen and oxygen. Typically, oxygen moves outwardly into a surrounding jacket manifold, and passes to an oxygen outlet. The nitrogen flows downstream through the canisters and to an outlet manifold.

The nitrogen may be utilized as inert gas on an aircraft, such as to prevent explosion or flame in a fuel system or for use in a fire extinguishing system. The known canisters typically must be heated to provide efficient operation.

Particularly, under some conditions, the air may not be as hot as desired. As an example, in an aircraft that includes such a module, warm-up, cruise conditions, or descent flight phases may result in the temperature not being maintained sufficiently high to generate nitrogen efficiently.

In the prior art modules, the separated oxygen flow would typically leave the oxygen manifold at the inlet end of the module.

SUMMARY OF THE INVENTION

An air separation module has an inlet for receiving a source of air. The inlet communicates with an inlet manifold and the inlet manifold communicates with a plurality of canisters. The canisters are provided with hollow fibers constructed such that oxygen can permeate the fiber and nitrogen passes through the fiber. A jacket manifold surrounds the canisters and the jacket manifold receives oxygen that has permeated the fibers. The canisters extend to a downstream end, and to an outlet. The jacket manifold communicates with a jacket outlet manifold and an outlet for separated oxygen. The outlet for the jacket manifold is at a downstream end of the canisters.

These and other features may be best understood from the following drawings and specification.

BRIEF DESCRIPTION OF THE DRAWINGS

FIG. 1 schematically shows an air separation module.

DETAILED DESCRIPTION

An air separation module 19 is shown in FIG. 1 that receives compressed air at an inlet 22. The air may be tapped from a compressor 20 incorporated into a gas turbine engine on an aircraft. The compressed air is hot and is directed into a manifold 21 that supplies the compressed air into a plurality of canisters 24, 26, 28, 30 and 32. The canisters are filled with fibers, which operate as known to separate nitrogen and oxygen from the air. In general, the oxygen flows outwardly through outer walls of the canisters and into a jacket manifold 48 surrounding each of the canisters.

A wall 34 separates the jacket manifold 48 from the inlet manifold 21.

A concern in the design of air separation modules is that the canisters must be maintained sufficiently hot to operate efficiently. In some cases, and under some flight conditions, a downstream end 42 of the canisters may be cool relative to an upstream end 40. Thus, the efficiency of separation has sometimes decreased along the length in some prior modules.

However, as shown, the jacket manifold 48 surrounds the canisters 24-32 to the downstream end 42 and communicates with a manifold 50 at the downstream end 42 leading to an outlet 52 for a use of oxygen 54. The nitrogen at the downstream end 42 passes through an outlet 46 and to a use 49 for the nitrogen.

By having the oxygen flow to the downstream end 42 through the jacket manifold 48, and having it leave at outlet 52, adjacent to, or at, the downstream end 42, additional heat is provided at the downstream end 42 of the canisters and to fibers filled therein in order to ensure more efficient separation along the entire flow length of the canisters 24-32.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An onboard nitrogen generating system comprising:
a source of hot air;
an air separation module having an inlet for receiving a source of air, said inlet communicating with an inlet manifold, and said inlet manifold communicating with a plurality of canisters, said canisters being provided with hollow fibers constructed such that oxygen can permeate the fiber and nitrogen passes through the fiber;
a jacket manifold surrounding said canisters, and said jacket manifold for receiving oxygen that has permeated the fibers;
said canisters extending to a downstream end and into a nitrogen outlet;
said jacket manifold communicating with a jacket manifold outlet and an outlet for separated oxygen, said jacket manifold outlet being at a downstream end of said canisters;
said oxygen outlet is also at said downstream end of said air separation module; and
said oxygen outlet being connected to a use for oxygen and said nitrogen outlet being connected to a use for nitrogen.

* * * * *